US012612311B2

(12) United States Patent (10) Patent No.: US 12,612,311 B2

Zones et al. (45) Date of Patent: Apr. 28, 2026

(54) MOLECULAR SIEVE BORON SSZ-117x

(71) Applicant: Chevron U.S.A. Inc., San Ramon, CA (US)

(72) Inventors: Stacey I. Zones, San Francisco, CA (US); Cong-Yan Chen, Kensington, CA (US)

(73) Assignee: Chevron U.S.A. Inc.

( * ) Notice: Subject to any disclaimer, the term of this patent is extended or adjusted under 35 U.S.C. 154(b) by 539 days.

(21) Appl. No.: 18/325,228

(22) Filed: May 30, 2023

(65) Prior Publication Data

US 2023/0382744 A1 Nov. 30, 2023

Related U.S. Application Data

(60) Provisional application No. 63/365,534, filed on May 31, 2022.

(51) Int. Cl.
| | |
|---|---|
| *C01B 33/26* | (2006.01) |
| *B01J 29/12* | (2006.01) |
| *B01J 35/70* | (2024.01) |
| *B01J 37/20* | (2006.01) |
| *C10G 35/095* | (2006.01) |

(52) U.S. Cl.
CPC ......... *C01B 33/2853* (2013.01); *B01J 29/126* (2013.01); *B01J 35/70* (2024.01); *B01J 37/20* (2013.01); *C10G 35/095* (2013.01); *B01J 2235/15* (2024.01); *C01P 2002/72* (2013.01); *C10G 2300/70* (2013.01)

(58) Field of Classification Search
CPC ........ B01J 29/047; B01J 29/10; B01J 29/126; B01J 29/86; B01J 35/70; B01J 37/20; B01J 2235/15; C01B 33/2853; C01B 39/48; C10G 35/095; C10G 2300/70
See application file for complete search history.

(56) References Cited

U.S. PATENT DOCUMENTS

| | | |
|---|---|---|
| 11,161,750 B1 | 11/2021 | Zones |
| 2005/0194289 A1 | 9/2005 | Overbeek et al. |
| 2006/0115417 A1 | 6/2006 | Yuen et al. |
| 2008/0058196 A1 | 3/2008 | Zones et al. |
| 2011/0318263 A1 | 12/2011 | Zones et al. |
| 2015/0011787 A1 | 1/2015 | Bellussi et al. |
| 2017/0128923 A1 | 5/2017 | Yang et al. |
| 2019/0256364 A1 | 8/2019 | Zones et al. |
| 2019/0375648 A1 | 12/2019 | Xie et al. |
| 2021/0221696 A1 | 7/2021 | Zones et al. |
| 2022/0072520 A1 | 3/2022 | Zones et al. |

FOREIGN PATENT DOCUMENTS

| | | |
|---|---|---|
| CN | 113343948 A | 9/2021 |
| WO | 2021082140 A1 | 5/2021 |

OTHER PUBLICATIONS

International Search Report and Written Opinion from PCT/US2023/067599 mailed Sep. 27, 2023.

*Primary Examiner* — Brian A McCaig

(74) *Attorney, Agent, or Firm* — Erich Joseph Gess; Melissa M. Hayworth; Terrence Michael Flaherty

(57) ABSTRACT

A novel synthetic crystalline borongermanosilicate molecular sieve material, designated boron SSZ-117x, is provided. The boron SSZ-117x can be synthesized using N,N,N,3,5-pentamethyladamantan-1-ammonium cations as a structure directing agent. The synthesis employs a boron pathway to achieve the boron molecular sieve. The boron SSZ-117x may be used in organic compound conversion reactions, such as reforming, and/or sorptive processes.

16 Claims, No Drawings

MOLECULAR SIEVE BORON SSZ-117x

CROSS REFERENCE TO RELATED APPLICATIONS

The present application claims priority to U.S. Provisional Application No. 63/365,534, filed May 31, 2022, the complete disclosure of which is incorporated herein by reference in its entirety.

FIELD

This disclosure relates to a novel synthetic crystalline molecular sieve designated SSZ-117x comprising boron in its framework. The disclosure also relates to its synthesis.

BACKGROUND

Molecular sieves are a commercially important class of materials that have distinct crystal structures with defined pore structures that are shown by distinct X-ray diffraction (XRD) patterns. The molecular sieves also have specific chemical compositions. The crystal structure defines cavities and pores that are characteristic of the specific type of molecular sieve. Providing new molecular sieves that offer differences in the crystal structure as well as the composition can lead to unique catalysts or adsorption/separation materials. Changing a crystal structure is always fraught with difficulties, but success can provide rewards in a new catalyst for organic compound conversion reactions. U.S. patent publication 2022/0072520 discloses the preparation of SSZ-117x. It does not, however, disclose a boron SSZ-117x.

SUMMARY

According to the present disclosure, a crystalline molecular sieve, designated boron SSZ-117x, is synthesized using N,N,N,3,5-pentamethyladamantan-1-ammonium cations as a structure directing agent (SDA). The synthesis has been found to be successful in providing a boron containing molecular sieve having the SSZ-117x crystal structure.

In one aspect, there is prepared a boron SSZ-117x molecular sieve having, in its as-synthesized form, a powder X-ray diffraction pattern including at least the peaks in Table 3 below.

In its as-synthesized and anhydrous form, the boron molecular sieve can have a chemical composition comprising the following molar relationship:

TABLE 1

|  | Typical | Preferred |
|---|---|---|
| $TO_2/B_2O_3$ | ≥10 | ≥15 |
| $Q^+/TO_2$ | >0 to 0.1 | >0 to 0.1 |
| $SiO_2/GeO_2$ | 4 to 12 | 7 to 10 | wherein T is a tetravalent element comprising silicon and germanium; and $Q^+$ comprises N,N,N,3,5-pentamethyladamantan-1-ammonium cations. In one embodiment, the ratio of $TO_2/B_2O_3$ is in the range of from 15-20.

In its calcined or ozonated form, the boron SSZ-117x molecular sieve can have a chemical composition comprising the following molar relationship:

$$B_2O_3:(n)TO_2$$

wherein n is ≥10; and T is a tetravalent element comprising silicon and germanium.

In a further aspect, there is provided a method of synthesizing the boron SSZ-117x molecular sieve. The method comprises (a) providing a reaction mixture comprising: (1) a FAU framework type zeolite; (2) a source of germanium; (3) a source of boron; (4) N,N,N,3,5-pentamethyladamantan-1-ammonium hydroxide (Q); (5) a source of fluoride ions; and (6) water. The reaction mixture is then subjected to crystallization conditions sufficient to form crystals of a SSZ-117x boron molecular sieve. T is as described above.

The boron containing molecular sieve is then treated to remove the structure directing agent (SDA), noted as Q above. The SDA can be removed by calcination, or by ozone treatment, e.g., at 150° C. It has also been found that treatment of the molecular sieve with dimethylformamide can also remove the SDA.

In yet a further aspect, there is provided a process of converting a feedstock comprising an organic compound to a conversion product which comprises contacting the feedstock at organic compound conversion conditions with a catalyst comprising the boron SSZ-117x molecular sieve.

Among other factors, the present process allows one to obtain a boron SSZ-117x molecular sieve, which is a borongermanosilicate. This new molecular sieve prepared by the present process offers unique abilities as a catalyst in organic compound conversion reactions, such as reforming. The molecular sieve also finds important value as an adsorption/separation material.

DETAILED DESCRIPTION

Definitions

The term "framework type" has the meaning described in the "Atlas of Zeolite Framework Types," by Ch. Baerlocher and L. B. McCusker and D. H. Olsen (Elsevier, Sixth Revised Edition, 2007).

The term "borongermanosilicate" refers to a crystalline microporous solid including boron, germanium and silicon oxides within its framework structure. The borongermanosilicate may be a "pure-borongermanosilicate" (i.e., absent other detectable metal oxides with its framework structure) or optionally substituted. When described as "optionally substituted," the respective framework may contain other atoms (e.g., Al, Ga, In, Fe, Ti, Zr) substituted for one or more of the atoms not already present in the parent framework.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in Chem. Eng. News 1985, 63(5), 26-27.

Synthesis of the Molecular Sieve

The present molecular sieve boron SSZ-117x is synthesized by (a) providing a reaction mixture comprising (1) a FAU framework type zeolite; (2) a source of germanium; (3) a source of boron; (4) N,N,N,3,5-pentamethyladamantan-1-ammonium hydroxide (Q); (5) a source of fluoride ions; and (6) water; and then (b) subjecting the reaction mixture to crystallization conditions sufficient to form crystals of a SSZ-117x boron molecular sieve. T is as described herein above. In one embodiment, the FAU framework zeolite has only a small amount of $Al_2O_3$. The ratio of $SiO_2/Al_2O_3$ can be 300 or greater. Thus, the framework contains a predominant amount of boron.

The reaction mixture can have a composition, in terms of molar ratios, within the ranges set forth in Table 2:

TABLE 2

| Reactants | Typical | Preferred |
|---|---|---|
| $TO_2/B_2O_3$ | ≥10 | 15 to 20 |
| $Q/TO_2$ | 0.10 to 1.00 | 0.20 to 0.70 |
| $F/TO_2$ | 0.10 to 1.00 | 0.20 to 0.70 |
| $H_2O/TO_2$ | 2 to 10 | 4 to 8 |
| $SiO_2/GeO_2$ | 4 to 12 | 7 to 10 | wherein T and Q are as described herein above.

Suitable sources of silicon oxide can include any suitable known source such as colloidal silica, fumed silica, precipitated silica, or alkali metal silicates. A FAU framework type zeolite, e.g., zeolite Y, can also be a source of silicon oxide. In such a case, the FAU framework type zeolite has a very high $SiO_2/Al_2O_3$ molar ratio of at least 250, and preferably at least 300 (e.g., 300 to 500). The FAU framework type zeolite can comprise two or more FAU framework type zeolites having different $SiO_2/Al_2O_3$ molar ratios. The FAU framework type zeolite can be zeolite Y, or any of its various post-synthetic modified forms, as is known in the art. The inclusion of boron in the final framework by the present process is most important.

Sources of germanium can include germanium oxide and germanium alkoxides (e.g., germanium ethoxide, germanium isopropoxide), germanium hydroxides and germanium carboxylates.

Silicon and germanium may be present in the reaction mixture in a $SiO_2/GeO_2$ molar ratio of 4 to 12 (e.g., 6 to 10).

Sources of boron can include boric acid, which is preferred. Other suitable sources can also be used but are not preferred.

Sources of fluoride ions can include, for example, hydrogen fluoride, ammonium fluoride, and ammonium bifluoride.

SSZ-117x with boron is synthesized using a structure directing agent comprising N,N,N,3,5-pentamethyladamantan-1-ammonium cations (Q+), represented by the following structure (1):

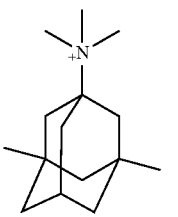

(1)

The reaction mixture typically has a Q/F molar ratio in a range of 0.80 to 1.20 (e.g., 0.85 to 1.15, 0.90 to 1.10, 0.95 to 1.05, or 1 to 1).

The reaction mixture can contain seeds of a molecular sieve material, such as boron SSZ-117x from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of boron SSZ-117x over any undesired phases.

It is noted that the reaction mixture components can be supplied by more than one source. Also, two or more reaction components can be provided by one source. The reaction mixture can be prepared either batchwise or continuously.

Crystallization and Post-Synthesis Treatment

Crystallization of the boron molecular sieve from the above reaction mixture can be carried out under either static, tumbled or stirred conditions in a suitable reactor vessel (e.g., a polypropylene jar or a Teflon™-lined or stainless-steel autoclave) at a temperature of from 125° C. to 200° C. (e.g., 150° C. to 170° C.) for a time sufficient for crystallization to occur at the temperature used (e.g., 1 day to 20 days, or 2 days to 10 days). The hydrothermal crystallization process is typically conducted under pressure, such as in an autoclave, and is preferably under autogenous pressure.

Once the molecular sieve crystals containing boron have formed, the solid product can be recovered from the reaction mixture by standard mechanical separation techniques such as centrifugation or filtration. The recovered crystals are water-washed and then dried to obtain as-synthesized molecular sieve crystals of SSZ-117x boron. The drying step can be performed at an elevated temperature (e.g., 75° C. to 150° C.) for several hours (e.g., about 4 to 24 hours). The drying step can be performed under vacuum or atmospheric pressure.

As a result of the crystallization process, the recovered crystalline molecular sieve product contains within its pore structure at least a portion of the structure directing agent used in the synthesis. The as-synthesized molecular sieve may be subjected to treatment to remove part or all of the structure directing agent used in its synthesis.

Removal of the structure directing agent may be carried out by thermal treatment (e.g., calcination) in which the as-synthesized molecular sieve is heated at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. for at least a minute and generally not longer than 20 hours (e.g., from 1 to 12 hours). The thermal treatment can be performed at a temperature of up to 925° C. For example, the thermal treatment may be conducted at a temperature of 400° C. to 600° C. in the presence of an oxygen-containing gas.

Additionally, or alternatively, the structure directing agent may be removed by treatment with ozone. See, e.g., A. N. Parikh et al., Micropor. Mesopor. Mater. 2004, 76, 17-22. In one embodiment, the use of ozone is preferred in that it provides a higher micropore volume. It has also been found that the SDA can be removed by treatment with dimethylformamide, e.g., treatment at about 150° C.

Characterization of the Molecular Sieve

In its as-synthesized and anhydrous form, molecular sieve SSZ-117x with boron can have a chemical composition comprising the following molar relationship set forth in Table 1:

TABLE 1

| | Typical | Preferred |
|---|---|---|
| $TO_2/B_2O_3$ | ≥10 | ≥15 |
| $Q^+/TO_2$ | >0 to 0.1 | >0 to 0.1 |
| $SiO_2/GeO_2$ | 4 to 12 | 7 to 10 | wherein T is a tetravalent element comprising silicon and germanium; and Q+ comprises N,N,N,3,5-pentamethyladamantan-1-ammonium cations. In some aspects, the molecular sieve can have a $SiO_2/GeO_2$ molar ratio in a range of 4 to 12 (e.g., 6 to 10). In one embodiment, the $SiO_2/GeO_2$ molar ratio is in the range of 7 to 10, and is preferably about 9. In one embodiment, the ratio of $TO_2/B_2O_3$ is in the range from 15-20.

It should be noted that the as-synthesized form of the present SSZ-117x molecular sieve with boron may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined form, molecular sieve boron SSZ-117x can have a chemical composition comprising the following molar relationship:

$$B_2O_3{:}(n)TO_2$$

wherein n is $\geq 10$ (e.g., 15 or greater, or in the range of 15-20); and T is a tetravalent element comprising silicon and germanium.

Molecular sieve boron SSZ-117x is characterized by a powder XRD pattern, which, in the as-synthesized form of the molecular sieve, includes at least the peaks set forth in Table 3 below. In another aspect, the boron SSZ-117x, after being subjected to ozonalysis, has a unique XRD pattern comprising at least the peaks set forth in Table 4 below.

TABLE 3

| Characteristic Peaks for As-Synthesized Boron SSZ-117x | | |
| --- | --- | --- |
| 2-Theta[a] | d-Spacing, nm | Relative Intensity[b] |
| 4.03 | 2.191 | VS |
| 4.54 | 1.943 | M |
| 8.05 | 1.098 | W |
| 11.65 | 0.759 | VS |
| 12.07 | 0.733 | M |
| 14.10 | 0.628 | W |
| 14.47 | 0.611 | M |
| 16.23 | 0.546 | W |
| 17.66 | 0.502 | M |
| 18.86 | 0.470 | M |
| 20.30 | 0.437 | W |
| 21.71 | 0.409 | M |

[a]±0.30 degrees
[b]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

TABLE 4

| Characteristic Peaks for Calcined Boron SSZ-117x | | |
| --- | --- | --- |
| 2-Theta[a] | d-Spacing, nm | Relative Intensity[b] |
| 8.00 | 1.10 | M |
| 11.65 | 0.76 | VS |
| 18.8 | 0.47 | M |
| 21.8 | 0.41 | M(Broad) |
| 22.8 | 0.39 | S |

[a]±0.30 degrees
[b]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

As will be understood by those of skill in the art, the determination of the parameter 2-theta (2θ) is subject to both human and mechanical error, which in combination can impose an uncertainty of about ±0.30° on each reported value of 2-theta. The relative intensity ($100 \times I/I_o$) is recorded as the ratio of the peak intensity to that of the most intense peak, which is assigned a value of 100. The relative intensities of the d-spacings are indicated by the notations VS, S, M, and W which represent very strong, strong, medium, and weak, respectively. In terms of relative intensity, the above designations are defined as: W (weak)<20; M (medium) is >20 and <40; S (strong) is 40 and <60; and VS (very strong) is 60. When the intensity is near the endpoint for a range, the intensity may be characterized as being in either of the ranges. For example, intensities of 18-22 may be listed as W-M. However, due to variations in intensity of the lines, as known in the art, one or more of the lines may have an intensity that is in an adjacent range The powder X-ray diffraction pattern presented herein was collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Sorption and Catalysis

The present molecular sieve boron SSZ-117x (where part or all of Q+ is removed) may be used as a sorbent or as a catalyst to catalyze a wide variety of organic compound conversion processes. Particular application is the use of boron SSZ-117x as a catalyst in reforming processes. In one embodiment, the catalyst also comprises platinum.

Catalytic reforming is one of the basic petroleum refining processes for upgrading light hydrocarbon feedstocks, frequently referred to as naphtha feedstocks. Products from catalytic reforming can include high octane gasoline useful as automobile fuel, aromatics (for example benzene, toluene, xylenes and ethylbenzene), and/or hydrogen. Reactions typically involved in catalytic reforming include dehydrocylization, isomerization and dehydrogenation of naphtha range hydrocarbons, with dehydrocyclization and dehydrogenation of linear and slightly branched alkanes and dehydrogenation of cycloparaffins leading to the production of aromatics. Dealkylation and hydrocracking are generally undesirable due to the low value of the resulting light hydrocarbon products.

The boron SSZ-117x catalyst used in catalysts commonly used in commercial reforming reactions often include a Group VIII metal, such as platinum or palladium, or a Group VIII metal plus a second catalytic metal, which acts as a promoter. Examples of metals useful as promoters include rhenium, tin, tungsten, germanium, cobalt, nickel, rhodium, ruthenium, iridium or combinations thereof. The catalytic metal or metals may be dispersed on a support such as alumina, silica, or silica-alumina.

The boron SSZ-117x reforming catalyst may be employed in the form of pills, pellets, granules, broken fragments, or various special shapes, disposed as a fixed bed within a reaction zone, and the charging stock may be passed through in the liquid, vapor, or mixed phase, and in either upward, downward or radial flow. Alternatively, the reforming catalysts can be used in moving beds or in fluidized-solid processes, in which the charging stock is passed upward through a turbulent bed of finely divided catalyst. However, a fixed bed system or a dense-phase moving bed system are preferred due to less catalyst attrition and other operational advantages. In a fixed bed system, the feed is preheated (by any suitable heating means) to the desired reaction temperature and then passed into a reaction zone containing a fixed bed of the catalyst. This reaction zone may be one or more separate reactors with suitable means to maintain the desired temperature at the reactor entrance. The temperature must be maintained because reforming reactions are typically endothermic in nature.

The actual reforming conditions often depend, at least in part, on the feed used, whether highly aromatic, paraffinic or naphthenic and upon the desired octane rating of the product and the desired hydrogen production.

EXAMPLES

The following illustrative examples are intended to be non-limiting.

Example 1

Synthesis of N,N,N,3,5-Pentamethyladamantan-1-ammonium Hydroxide 3,5-Dimethyladamantan-1-amine was permethylated by treatment with a greater than 3-fold excess of methyl iodide and 2 equivalents of potassium bicarbonate in methanol over several days. The reaction mixture was concentrated under reduced pressure and the resulting solids were extracted 2 times with chloroform. The crude product was recovered by rotary evaporation of the chloroform under reduced pressure. The crude product was recovered by stripping off the chloroform. The crude product was heated in a minimum amount of 95% ethanol at 70° C. to produce a clear solution. The solution was allowed to cool to room temperature to provide the iodide salt as very clean crystals. The purity of the product was then verified by both a chemical analysis and H and C NMR in CDCL3.

The resulting iodide salt was exchanged to the corresponding hydroxide salt by stirring it with hydroxide exchange resin (AMBERLITE© IRN78) in deionized water overnight. The solution was filtered, and the filtrate was analyzed for hydroxide concentration by titration of a small sample with a standard solution of 0.1 N HCl.

Example 2

Synthesis of SSZ-117x with Boron

Into a tared 23 mL Parr reactor was added 0.27 g of Tosoh 390HUA Y-zeolite ($SiO_2/Al_2O_3$ molar ratio of about 500), 0.05 g of $GeO_2$, 0.02 g $H_3BO_3$, and 2.5 mmoles of an aqueous N,N,N,3,5-pentamethyladamantan-1-ammonium hydroxide solution. The reactor was then placed in a vented hood and water was allowed to evaporate to bring the $H_2O/(SiO_2+GeO_2)$ molar ratio to 7 (as determined by the total mass of the suspension). Then, HF (2.5 mmoles) was added and the reactor was heated to 160° C. with tumbling at 43 rpm for about 7 days. The solid products were recovered by centrifugation, washed with deionized water and dried at 95° C.

Powder XRD will show the final product to be a pure form of a new phase, designated SSZ-117x boron and exhibiting the characteristic peaks of Table 3.

Example 3

The as-synthesized boron SSZ-117 x of Example 2 was heated for 5 days at 150° C. in an excess of Dimethylformamide in a closed reactor. Upon cooling the solids were washed free of the solvent and then with water and dried at 95° C. The mass loss was 20% from this extraction. Then the dried solid was subjected to an ozonolysis at 150° C., overnight to remove any residual SDA in the pores. The open structure now had a greatly changed XRD pattern which is shown in Table 4.

TABLE 4

| 2-Theta[(a)] | d-Spacing, nm | Relative Intensity[(b)] |
|---|---|---|
| 8.00 | 1.10 | M |
| 11.65 | 0.76 | VS |
| 18.8 | 0.47 | M |
| 21.8 | 0.41 | M(Broad) |
| 22.8 | 0.39 | S |

[(a)]±0.30 degrees

[(b)]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

Example 4

An as-synthesized sample of SSZ-117 with boron and Ge is treated with 10 cc of Dimethylformamide/gm of zeolite at 150° C. in a closed reactor for 3 days. The material is collected by filtration and then washed with water. After drying the material (whose xrd pattern has gone from SSZ-117 to 117x), is then treated overnight with flowing ozone at 150° C. to finish removing the organic used to make the zeolite.

Next the material (0.825 grams) is treated in 12 ml of water with 0.128 grams of 50% CsOH in order to neutralize any acidity. The treatment is carried out for 25 hours at room temperature and then filtered. The collected solids are then calcined to 300° C. in air.

The calcined boron SSZ-117x is then redispersed in 18 ml of water with 0.0155 grams of platinum tetramine chloride and stirred for 24 hours at room temperature. The material is then collected, calcined to 300° C. and then pressed and meshed to 24/40 pieces for loading a reactor.

Example 5

Pretreatment of Catalytic Naphtha Reforming Catalyst

The catalytic naphtha reforming catalyst prepared in Example 4 is sulfided. The sulfiding reactions were conducted in down flow fixed bed reactor systems. The procedure is described as follows:

The catalyst was meshed to 24-40 chips and then loaded into the center of a stainless steel tube reactor. The catalyst (0.6 g dry weight as determined at 1112° F. by TGA (Thermogravimetric Analysis)) was first dried in a $N_2$ flow (300 ml/min) from room temperature to 400° F. at a heating rate of 10° F./min and kept at 400° F. for 30 minutes. For the reduction of the platinum in the catalyst, the catalyst was subsequently heated in a $H_2$ flow (300 ml/min) from 400° F. to 900° F. at a heating rate of 5° F./min and kept at 900° F. for 30 minutes. Finally, the catalyst was cooled down to 800° F. to start the sulfiding reactions.

The feed applied for sulfiding reactions was anhydrous n-octane containing 200 ppm sulfur (as dimethyl disulfide). The sulfiding was carried out at 800° F. and atmospheric pressure for 60 minutes. The $H_2$ and liquid feed flow rates were 30 ml/min and 0.43 ml/min, respectively. After sulfiding, the catalyst was heated in a $H_2$ flow (300 ml/min) from 800 to 900° F. within minutes and then at 900° F. for another 30 minutes in order to remove the excess sulfur species occluded in the pores and/or on the surface of the catalyst. Finally, the catalyst was heated up or cooled down to the preset reaction temperature (e.g., 850 or 950° F.) within 2 hours in the same $H_2$ flow (300 ml/min) to be ready for starting the catalytic naphtha reforming testing in Example 6.

Example 6

Procedure of Catalytic Naphtha Reforming Testing

After the sulfiding procedure described in Example 5, the catalytic naphtha reforming reactions were conducted as described below.

The catalyst was heated up or cooled down to the preset reaction temperature (950° F. for Example 8) within 2 hours in the same $H_2$ flow (300 ml/min) to be ready for starting the catalytic naphtha reforming testing in the present example, as described in Example 5. At the same time, the reactor system was pressurized to the preset pressure (150 psig for Example 8). Meanwhile, the $H_2$ flow was adjusted to the preset rate (16 ml/min for Example 8). The feed rate was 1.75 ml/hour (for Example 8).

In the following example, the catalytic naphtha reforming experiment was carried out at hydrocarbon WHSV of 2.2 and molar ratio of hydrogen to hydrocarbon of 3.0 by using the naphtha feed described in Example 7.

Example 7

Feed for Catalytic Naphtha Reforming Testing

The GC analytical data from the feed used for the catalytic naphtha reforming testing are given in Table 5, together with the GC results from Example 8 for its catalytic naphtha reforming testing product over the catalyst described in Example 4. The GC data were acquired via on-line analysis.

Example 8

Product from Catalytic Naphtha Reforming Testing

The GC analytical data from the feed of Example 7, used in the catalytic naphtha reforming testing, are given in Table 5, together with the results from the present example for its catalytic naphtha reforming testing product over the catalyst described in Example 4. The catalytic naphtha reforming experiment was carried out at 950° F., 150 psig, hydrocarbon WHSV of 2.2 and molar ratio of hydrogen to hydrocarbon of 3.0.

GC results from the feed (Example 7) used for catalytic naphtha reforming testing and from its catalytic naphtha reforming testing product (Example 8) over the catalyst described in Example 4 are shown in Table 5 below. Reaction conditions: 950° F., 150 psig, hydrocarbon WHSV of 2.2 and molar ratio of hydrogen to hydrocarbon of 3.0.

TABLE 5

| Component, in wt. % | Feed (Example 7) | Product (Example 8) |
|---|---|---|
| Methane | 0 | 0.2 |
| ethane | 0 | 0.7 |
| propane | 0 | 1.0 |
| iso-butane | 0 | 0.3 |
| n-butane | 0 | 0.5 |
| iso-pentane | 0 | 0.2 |
| n-pentane | 0 | 0.3 |
| cyclopentane | 0 | 0.1 |
| iso-hexanes | 0.5 | 0.9 |
| n-hexane | 1.5 | 2.2 |
| C6 naphthenes | 2.5 | 2.5 |
| benzene | 0 | 2.1 |
| iso-heptanes | 1.2 | 9.2 |
| n-heptane | 7.2 | 9.3 |
| C7 naphthenes | 4.7 | 12.1 |
| toluene | 5.6 | 7.7 |
| iso-octanes | 31.3 | 16.3 |
| n-octane | 13.1 | 8.0 |
| C8 naphthenes | 4.3 | 3.5 |
| ethylbenzene | 1.4 | 2.1 |
| xylenes | 5.7 | 7.4 |
| heavier paraffins and naphthenes | 20.1 | 12.9 |
| heavier aromatics | 0.9 | 1.4 |

The product, as shown in Table 5, indicates a significant increase in aromatics, which are useful for high octane gasoline. The boron SSZ-117x successfully reformed the feedstock of Example 7.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

The invention claimed is:

1. A molecular sieve having in its as-synthesized form, a powder X-ray diffraction pattern including the following peaks:

| 2-Theta[a] | d-Spacing, nm | Relative Intensity[b] |
|---|---|---|
| 4.03 | 2.191 | VS |
| 4.54 | 1.943 | M |
| 8.05 | 1.098 | W |
| 11.65 | 0.759 | VS |
| 12.07 | 0.733 | M |

-continued

| 2-Theta$^{(a)}$ | d-Spacing, nm | Relative Intensity$^{(b)}$ |
|---|---|---|
| 14.10 | 0.628 | W |
| 14.47 | 0.611 | M |
| 16.23 | 0.546 | W |
| 17.66 | 0.502 | M |
| 18.86 | 0.470 | M |
| 20.30 | 0.437 | W | and with the molecular sieve comprising boron and having a composition comprising the molar relationship:

$$B_2O_3{:}(n)TO_2$$

wherein n is $\geq 10$; and T is a tetravalent element comprising silicon and germanium.

2. The molecular sieve of claim 1, having a composition comprising the molar relationship:

$$B_2O_3{:}(n)TO_2$$

wherein n is $\geq 15$.

3. The molecular sieve of claim 1, having a chemical composition comprising the following molar relationship:

| | |
|---|---|
| $TO_2/B_2O_3$ | $\geq 10$ |
| $Q^+/TO_2$ | $>0$ to 0.1 |
| $SiO_2/GeO_2$ | 4 to 12 | wherein Q$^+$ comprises N,N,N,3,5-pentamethyladaman-tan-1-ammonium cations.

4. The molecular sieve of claim 3, which is sulfided and comprises a Group VIII metal.

5. The molecular sieve of claim 4, wherein the Group VIII metal is platinum or palladium.

6. A process for converting a feedstock comprising an organic compound to a conversion product, the process comprising contacting the feedstock at organic compound conversion conditions with a catalyst comprising the molecular sieve of claim 5.

7. The process of claim 6, wherein the conversion reaction is reforming.

8. A process for converting a feedstock comprising an organic compound to a conversion product, the process comprising contacting the feedstock at organic compound conversion conditions with a catalyst comprising the molecular sieve of claim 4.

9. The process of claim 8, wherein the conversion reaction is reforming.

10. A process of ion exchanging metals, the process comprising contacting a stream comprising heavy metals with the molecular sieve of claim 3.

11. A method of synthesizing the molecular sieve of claim 1, the method comprising:
  (a) providing a reaction mixture comprising:
    (1) a FAU framework type zeolite having a $SiO_2/Al_2O_3$ molar ratio of at least 300;
    (2) a source of germanium;
    (3) a source of boron;
    (4) N,N,N,3,5-pentamethyladamantan-1-ammonium hydroxide (Q);
    (5) a source of fluoride ions; and
    (6) water;
  (b) subjecting the reaction mixture to crystallization conditions sufficient to form crystals of the molecular sieve; and
  (c) removing Q from the molecular sieve framework.

12. The method of claim 11, wherein the reaction mixture has a composition, in terms of molar ratios, as follows:

| | |
|---|---|
| $TO_2/B_2O_3$ | $\geq 10$ |
| $Q/TO_2$ | 0.10 to 1.00 |
| $F/TO_2$ | 0.10 to 1.00 |
| $H_2O/TO_2$ | 2 to 10 |
| $SiO_2/GeO_2$ | 4 to 12 | wherein T is a tetravalent element comprising silicon and germanium.

13. The method of claim 11, wherein the reaction mixture has a composition, in terms of molar ratios, as follows:

| | |
|---|---|
| $TO_2/B_2O_3$ | 15 to 20 |
| $Q/TO_2$ | 0.20 to 0.70 |
| $F/TO_2$ | 0.20 to 0.70 |
| $H_2O/TO_2$ | 4 to 8 |
| $SiO_2/GeO_2$ | 7 to 10 | wherein T is a tetravalent element comprising silicon and germanium.

14. The method of claim 11, wherein the FAU framework type zeolite is zeolite Y, or a post-synthetic modified form.

15. The method of claim 11, wherein the crystallization conditions include a temperature of from 125° C. to 200° C.

16. The method of claim 11, wherein the reaction mixture has a Q/F molar ratio in a range of 0.8 to 1.2.

\* \* \* \* \*